Patented June 7, 1927.

1,631,244

UNITED STATES PATENT OFFICE.

CHARLES EDGERTON CARTER, OF PASADENA, CALIFORNIA.

MEDICINE.

No Drawing.   Application filed February 9, 1926. Serial No. 87,091.

This invention relates to a new and useful medicine.

It has been scientifically demonstrated and is generally recognized that there are present in the human lower intestinal tract certain protective bacilli which operate to produce lactic acid and thus oppose the increase and effect of intestinal putrefactive bacteria. These protective bacilli require carbohydrates for their proliferation and growth. The breast-fed infant alone receives available carbohydrate for production of such protective bacilli in quantities sufficient to be an appreciable factor. While these lactic acid bacilli are most tenacious of life and persists within the human intestinal tract throughout life, they are underfed and over poisoned by the excess protein of our modern diet. Consequently many ailments and diseased conditions are caused through the lack of sufficient colonies of such protective bacilli in the lower intestinal tract or colon, to overcome action of the destructive putrefactive bacteria. These putrefactive bacteria are constantly taken in and upon different foods and the growth of such putrefactive bacteria is furthermore augmented by certain foods in the stomach and intestines, such as meats, milk, cheese and all decomposing animal tissues. Such foods do not facilitate the proliferation or growth of the protective bacilli. The protective bacilli are not produced in sufficient quantities through failure of the ordinary diet to provide available carbohydrates as suitable food for such protective bacilli.

Heretofore, attempts have been made to overcome this dietetic imbalance by feeding patients excessive quantities (10 to 12 ounces daily) of available carbohydrates, such as sugar of milk or dextrin. It has been necessary in attempting this character of treatment to employ such excessive quantities of carbohydrates, as of milk sugar, etc., because of the solubility of all sugars in the digestive juices. The greater part of such sugars is digested and absorbed prior to its reaching the lower intestinal tract where it may operate to produce the active growth of the protective bacilli, indigenous to the lower intestine or colon. Accordingly, such attempts to activate the growth of these protective bacilli by this supply of a large bulk of carbohydrates necessarily involved the disadvantage of supplying a greater proportion of carbohydrates than is necessary or healthful for a balanced diet.

It is an object of the present invention to provide a medicine or medical product which will operate to carry carbohydrates such as sugar of milk into the lower intestinal tract, to there supply the necessary food for the protective bacilli without requiring the simultaneous over-dosing of the stomach and upper intestine with such carbohydrates.

Another object of the present invention is to provide a medicine or medical product which will increase the peristaltic action of the bowel, operate to lubricate the food within the same and to deposit this essential food for the growth of protective lactic acid bacilli within the lower bowel or colon. This results not only in active bacilli which oppose the action of the putrefactive bacteria, but facilitates the removal thereof from the body of the colonic residue or fæces.

The invention will be more readily understood from the following description of a preferred medicine or medical product embodying the invention. For this purpose, the invention will now be described in its preferred form.

A carbohydrate such as sugar, is first combined with a material which will operate to (one) facilitate conveying the carbohydrate into the lower intestinal tract or to increase peristalsis in order that the absorption of the carbohydrate during its passage through the upper bowel can be substantially retarded and (two) is moisture proof and adapted to retard the action of the digestive juices upon the carbohydrate. An example of a suitable media for this purpose is mineral oil or a product obtained from mineral oil by the removal of all unstable and unsaturated materials. Such mineral oil is combined together with a carbohydrate to form a permanent or quickly equalized suspension of the same in which the particles of the carbohydrate will be enclosed and encased by such protective media and can thus pass with little or no digestion into the lower intestinal tract or colon.

The carbohydrate employed may be of various kinds but I prefer to employ lactose or milk sugar, as it possesses the most desirable soluble properties, that is, it is sufficiently soluble when in the lower intestinal tract, where peristalsis is retarded, to readily facilitate the growth of the protective bacilli and yet is so slowly soluble that when protected by the mineral oil, it is but slightly consumed in its passage through the upper intestinal tract.

To this suspension of mineral oil and milk sugar or lactose, there is preferably added a glutinizing or cohesive agent such as agar agar for rendering the resultant suspension more stable.

As an example of the best proportions so far ascertained, I have employed in making 100 volumes of finished product, 60 to 70 volumes of mineral oil, 50 to 40 volumes (40%–30%) of sugar of milk, to which is added 1½% of the glutinizing or cohesive element such as agar agar with suitable flavoring agents.

This medical product or medicine may be generally employed wherever the present bulk method of treatment with sugar of milk is now employed or wherever it is desired to decrease the putrefactive bacteria and increase the protective bacilli in the intestinal tract or colon. As contrasted with the present treatment with lactose or other sugars, requiring doses of from 10 to 12 ounces, equal results may be obtained with the present product by the use of ½ to 1 tablespoonful. This for the reason that substantially all of the food for the protective bacilli, by means of the combination of the present invention, is carried to the lower intestinal tract where it may operate, whereas by the prior bulk treatment only a small percentage of the carbohydrate withstands the digestive actions in its passage to the lower intestinal tract.

The operation of the product not only facilitates the growth of these protective bacteria or lactic acid bacilli but also operates to lubricate the contents of the intestinal tract. The increase in the lactic acid bacilli results in the formation of the lactic acid which in addition to antagonizing putrefactive bacteria and harmful amœba, facilitates the bowel peristaltic action and thus augments by such acid reaction the laxative effect of said contained mineral oil and agar. Moreover, since to the above mentioned product no water is added, the film of oil rising to the top of bottle-contents, upon standing, serves to hermetically seal the ingredients from contamination and moisture, resulting in a product permanent in all climates.

While the preferred form of medical product has been described, it is understood that the invention is not limited to the specific product described for the purpose of more clearly illustrating the invention, but the invention includes all such modifications as come within the scope of the appended claims.

I claim:

1. A medical product comprising sugar of milk suspended in medical oil and agar agar.

2. A medical product comprising approximately 60 to 70 volumes medical oil and 40 to 30% by weight of milk-sugar in form of a suspension.

3. A medical product comprising 60 to 70 volumes of medical oil, 30 to 40% by weight of lactose and 1½% of glutinizing agent in form of a suspension.

4. A medical product comprising sugar adaptable as food for lactic acid bacilli, suspended in mineral oil in amount sufficient to protect said sugar in its passage through the alimentary tract to provide food in the colon for the lactic acid bacilli.

Signed at Los Angeles, Calif., this 27th day of January 1926.

CHARLES EDGERTON CARTER.